United States Patent
Zlotnick (10) Patent No.: US 11,488,014 B2
(45) Date of Patent: Nov. 1, 2022

(54) AUTOMATED SELECTION OF UNANNOTATED DATA FOR ANNOTATION BASED ON FEATURES GENERATED DURING TRAINING

(71) Applicant: International Business Machines Corporation, Armonk, NY (US)

(72) Inventor: Aviad Zlotnick, Mitzpeh Netofah (IL)

(73) Assignee: International Business Machines Corporation, Armonk, NY (US)

( * ) Notice: Subject to any disclaimer, the term of this patent is extended or adjusted under 35 U.S.C. 154(b) by 613 days.

(21) Appl. No.: 16/659,603

(22) Filed: Oct. 22, 2019

(65) Prior Publication Data

US 2021/0117775 A1  Apr. 22, 2021

(51) Int. Cl.
*G06V 10/00* (2022.01)
*G06N 3/08* (2006.01)
*G06N 5/04* (2006.01)
*G06K 9/62* (2022.01)
*G06N 20/10* (2019.01)

(52) U.S. Cl.
CPC .............. *G06N 3/08* (2013.01); *G06K 9/623* (2013.01); *G06K 9/6259* (2013.01); *G06N 5/04* (2013.01); *G06N 20/10* (2019.01)

(58) Field of Classification Search
CPC ............ G06N 3/02; G06N 3/08; G06N 3/082; G06N 3/084; G06N 3/088; G06N 20/00; G06N 7/046; G06N 5/04; G06K 9/623; G06K 9/6259; G06V 10/70; G06V 10/766; G06V 10/774; G06V 30/191; G06V 30/19147; G06T 3/4046; G06T 9/002; G06T 2207/20081; G06T 2207/20084
See application file for complete search history.

(56) References Cited

U.S. PATENT DOCUMENTS

| 9,911,413 | B1 | 3/2018 | Kumar et al. |
| 10,169,315 | B1 * | 1/2019 | Heckel ................. G06N 3/0481 |
| 10,671,887 | B2 * | 6/2020 | Danielsson .......... G06V 10/454 |

(Continued)

OTHER PUBLICATIONS

Hedderich, Michael et al., "Training a Neural Network in a Low-Resource Setting on Automatically Annotated Noisy Data," Proceedings of the Workshop on Deep Learning Approaches for Low-Resource NLP, Melbourne Australia, Jul. 19, 2018, pp. 12-18, Retrieved from https://www.aclweb.org/anthology/W18-3402.

*Primary Examiner* — Amir Alavi
(74) *Attorney, Agent, or Firm* — Barry D. Blount (57) ABSTRACT

An example system includes a processor to train a neural network model using annotated training data to generate features. The processor is to select a feature vector of the neural network model. The processor is to execute an inference stage on the annotated training data via the neural network model to generate a first set of values corresponding to the annotated training data for features in the selected feature vector. The processor is to execute the inference stage on unannotated data to generate a second set of values corresponding to the unannotated data for the features in the selected feature vector. The processor is to select an item in unannotated data that matches an uncovered combination of feature values in the annotated training data. The processor is to send the selected item for annotation and receive a corresponding additional annotated item to be added to the annotated training data.

20 Claims, 6 Drawing Sheets

(56) References Cited

U.S. PATENT DOCUMENTS

| | | | |
|---|---|---|---|
| 11,004,236 B2* | 5/2021 | Mustafi | G06T 7/75 |
| 11,017,019 B1* | 5/2021 | Hohwald | G06F 16/24578 |
| 11,074,686 B2* | 7/2021 | Kim | G06N 3/0454 |
| 11,127,074 B2* | 9/2021 | Ghadar | G06T 19/006 |
| 11,132,600 B2* | 9/2021 | Singh | G06N 3/063 |
| 11,151,451 B2* | 10/2021 | Li | G06N 3/08 |
| 11,165,954 B1* | 11/2021 | Beach | H04N 5/23225 |
| 11,367,263 B1* | 6/2022 | Devernay | G06T 7/337 |
| 11,398,227 B1* | 7/2022 | Berckmann | G10L 15/183 |
| 2018/0240031 A1 | 8/2018 | Huszar et al. | |
| 2018/0364979 A1 | 12/2018 | Guttmann | |
| 2019/0050625 A1* | 2/2019 | Reinstein | G06K 9/627 |
| 2019/0164054 A1 | 5/2019 | Lee et al. | |

* cited by examiner

AUTOMATED SELECTION OF UNANNOTATED DATA FOR ANNOTATION BASED ON FEATURES GENERATED DURING TRAINING

BACKGROUND

The present techniques relate to annotation of training data. More specifically, the techniques relate to selection of training data for annotation.

SUMMARY

According to an embodiment described herein, a system can include processor to train a neural network model using annotated training data. The processor can also further select a feature vector of the neural network model. The processor can also execute an inference stage on the annotated training data via the neural network model to generate a first set of values corresponding to the annotated training data for features in the selected feature vector. The processor can execute the inference stage on unannotated data to generate a second set of values corresponding to the unannotated data for the features in the selected feature vector. The processor can select an item in unannotated data corresponding to an uncovered or weakly covered combination of feature values in the annotated training data. The processor can also send the selected item for annotation and receive a corresponding additional annotated item to be added to the annotated training data.

According to another embodiment described herein, a method can include training, via a processor, a neural network model using annotated training data. The method can further include selecting, via the processor, a feature vector of the neural network model. The method can also further include executing, via the processor, an inference stage on the annotated training data via the neural network model to generate a first set of values corresponding to the annotated training data for features in the selected feature vector. The method can also include executing, via the processor, the inference stage on unannotated data to generate a second set of values corresponding to the unannotated data for the features in the selected feature vector. The method can also include selecting, via the processor, an item in unannotated data corresponding to an uncovered or weakly covered combination of feature values in the annotated training data. The method can also further include sending, via the processor, the selected item for annotation and adding a received corresponding additional annotated item to the annotated training data.

According to another embodiment described herein, a computer program product for automatically selecting unannotated data for annotation can include computer-readable storage medium having program code embodied therewith. The computer readable storage medium is not a transitory signal per se. The program code executable by a processor to cause the processor to train a neural network model using annotated training data. The program code can also cause the processor to select a feature vector of the neural network model. The program code can also cause the processor to execute an inference stage on the annotated training data via the neural network model to generate a first set of values corresponding to the annotated training data for features in the selected feature vector. The program code can also cause the processor to execute the inference stage on unannotated data to generate a second set of values corresponding to the unannotated data for the features in the selected feature vector. The program code can also cause the processor to select an item in unannotated data corresponding to an uncovered or weakly covered combination of feature values in the annotated training data. The program code can also cause the processor to also further send the selected item for annotation and add a received corresponding additional annotated item to the annotated training data. The program code can also cause the processor to also train a neural network based on the annotated training data comprising the additional annotated item.

DETAILED DESCRIPTION

Neural networks can be trained on input annotated data to detect various objects based on a set of features. In some examples, the features may be known in advance. For example, the features may be extracted from clinical data in medical applications. The set of known features can be used to ensure that training and testing data covers all possible feature values, as well as combinations of possible feature values. This may ensure that the training and data cover the most diversified data population possible. However, some features may not be known in advance or cannot be known in advance. For example, some features may be computed by a neural network during training and thus cannot be known in advance of the training. Moreover, many neural networks work by computing hundreds or thousands of features, many of which may not correspond to any kind of human-identifiable property. It may thus be very difficult, if not impossible, to manually ensure that such computer-generated features are well represented in annotated data used for training. Moreover, annotation of all available data with all of the generated features, even if possible, may also be very resource intensive.

According to embodiments of the present disclosure, a processor can train a neural network model using annotated training data to generate features. The processor can select a feature vector of the neural network model. The processor can also execute an inference stage on the annotated training data via the neural network model to generate a first set of values corresponding to the annotated training data for features in the selected feature vector. The processor can further execute the inference stage on unannotated data to generate a second set of values corresponding to the unannotated data for the features in the selected feature vector. The processor can also further select an item in unannotated data that matches an uncovered combination of feature values in the annotated training data. The processor can send the selected item for annotation and receive a corresponding additional annotated item to be added to the annotated training data. Thus, embodiments of the present disclosure allow selection of a subset of data to be selected for use as training data. For example, the selected subset of data may be annotated and added to an existing set of annotated training data. The resulting training data may be used to train a neural network that has improved accuracy at inference due to being trained on the well represented training data set. The techniques may thus expedite enriching of training and testing data and save both time and expenses on implementing a machine learning solution.

Figure 1:
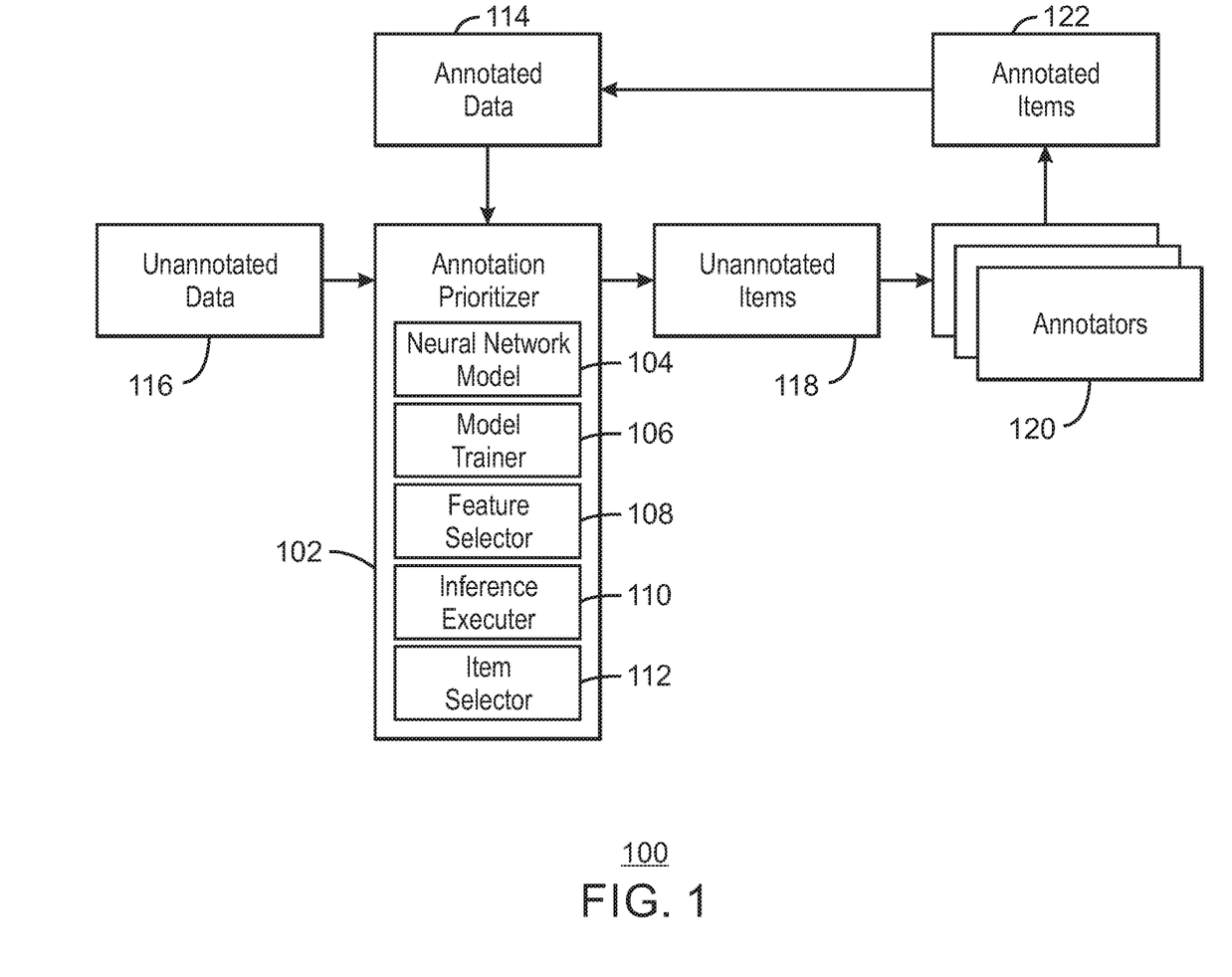
FIG. 1 is a block diagram of an example system for automatically selecting unannotated data items for annotation.

With reference now to FIG. 1, a block diagram shows an example system for automatically selecting unannotated data items for annotation. The example system is generally referred to by the reference number 100. FIG. 1 includes an annotation prioritizer 102. The annotation prioritizer 102 includes a neural network model 104. The annotation prioritizer 102 also includes a model trainer 106. The annotation prioritizer 102 also includes a feature selector 108 to select features of the neural network model 104. The annotation prioritizer 102 also includes an inference executer 110 to execute an inference stage of the neural network model 104. The annotation prioritizer 102 also includes an item selector 112 to select items of data from the unannotated data 106 for annotation.

In the example system 100 of FIG. 1, the annotation prioritizer 102 can receive an annotated data 114 and unannotated data 116. For example, the annotated data 114 may be images with bounding boxes including labeled objects of particular identified classes. The unannotated data 116 may be images without any labels. In various examples, the annotated data 114 and unannotated data 116 may various other forms of data, such as audio, depth data, etc. The annotation prioritizer 102 can send selected unannotated items 118 to annotators 110 for annotation. For example, the unannotated items 118 may be images without labels. In various examples, the annotators 110 may be any combination of automated machine learning techniques or manual annotation. The annotators 120 are shown generating annotated items 122. For example, the annotated items 122 may be images with labels corresponding to one or more classes of objects. The annotated items 122 may then be added to the annotated data 114. In this manner, the annotated data 114 may be iteratively expanded via selection and annotation of unannotated items 118 associated with feature combinations that are least covered by the annotated data 114. In some examples, the expanded annotated data 104 including the annotated items 122 may then be used to train a neural network for any type of classification tasks, such as computer vision tasks. The performance of the trained neural network may be significantly improved due to being trained on the expanded annotated data 114 including one or more iterations of added annotated items 122.

Still referring to FIG. 1, the neural network model 104 may be initially trained on the annotated data 114 in order to compute features. For example, the neural network model 104 may be a Deep Neural Network (DNN) configured to learn a set of features instead of the features being defined by a user. For example, the learned features may not be known in advance and may not be associated with any semantic meaning. In various examples, the neural network model 104 may have several layers that compute features and several fully connected layers that combine the features to yield a classification or a final score. In various examples, the model trainer 106 may train the neural network model 104 to learn a set of features.

In various examples, the feature selector 108 selects a feature vector of the generated features. For example, the feature selector 108 selects the first fully connected layer of the neural network model 104 to use for features. In some examples, any element in any feature vector of the neural network model 104 can be used as a feature. For example, the vector of features to be analyzed may include the first of the fully connected DNN layers, any layer above this layer, or any combination of several layers. In some examples, the feature selector 108 may also use principal component analysis (PCA) to reduce dimensionality. For example, the feature selector 108 may use PCA to reduce dimensionality for high order combinations, since DNN feature vectors may be very large. For example, DNN feature vectors may include hundreds or thousands of features.

The inference executer 110 may execute an inference on the annotated data 114 and the unannotated data 116 to collect information about the features in the selected feature vector. For example, the information may include the number of positive vector elements for each feature vector, or combinations of positive and negative values for tuples of vector elements in the feature vectors. In some examples, the presence of features may be included in the collected information. The values of the feature vectors values received from the neural network model 104 may be continuous. In some examples, the presence of features, significance of features, or extremity of features may therefore be defined by discrete quantizations of the feature vectors. For example, the quantization may be performed using absolute thresholds or with relative thresholds. As one example, absolute thresholds may include a set of ranges such as 0:0.3 for a first level, 0.3:0.5 for a second level, etc. An example of relative thresholds may be the lowest values of the top three, the top five, or the top ten feature values as thresholds. In various examples, the quantized feature vectors may be treated as predefined feature vectors.

In some examples, the selected feature vectors may be quantized using feature presence thresholds. For example, a feature presence threshold may be set as the median of all feature values. Thus, feature values lower than or equal to the median of all feature values may be set to zero, while values that exceed the median may be set to a value of one. In some examples, the feature vectors may be quantized using 2-way features. For example, 2-way features may be defined as tuples in the form (f1, f2, v1, v2), where f1 and f2 are the indices in the feature vector, and v1 and v2 are the corresponding values. In some examples, each of v1 and v2 may be either 0 or 1. The inference executer 110 can compute the feature vector for an input annotated data 114 or unannotated data 116. The item selector 112 can then compute the presence of features for all index pairs and value pairs. A feature that is detected by the item selector 112 as present in the unannotated data 116 set is may be defined as uncovered if the feature is not present in any item in the annotated data 114.

In various examples, the selected feature vectors may be quantized based on feature significance. For example, some 2-way features may be defined as significant. A significant 2-way feature may be defined as a 2-way feature that occurs in the annotated data 114 training set significantly more than would be expected from the frequency of each of its single features. For example, if the frequency of value 1 in feature f1 is 0.7 and the frequency of 0 in feature f2 is 0.3, 0.21 of the combinations of features f1 and f2 may be expected to have a value of (1, 0). If there are 1000 items in the training set, and 500 instead of 210 have a value of (f1, f2, 1, 0) then (f1, f2, 1, 0) may be determined to be significant.

In some examples, the selected feature vectors may be quantized using 1-way ranges. For example, the item selector 112 may identify feature values that are extreme per feature. For example, an extreme value may be higher than three standard deviations from the mean value of each feature. In some examples, values above the mean are considered separately from values below the mean. For example, instead of determining whether a feature value is extreme, a determination may be made as to whether the values are specifically extremely high or extremely low.

In various examples, the selected feature vectors may be quantized using two-way ranges. For example, with the same definition of extremity as in the 1-way ranges, 2-way features may be defined using various types of discretization per feature. For example, a low extreme discretization may be defined as a value of 1 corresponding to a low extreme, and a value of 0 representing all other values. Similarly, a high extreme discretization may be defined as a value of 1 representing a high extreme, while a value of 0 represents all other values. A low and high extreme discretization may be defined as a value 1 representing a low extreme, a value of 2 representing a high extreme, and a value of 0 representing all other values. A low or high extreme discretization may be defined as the value 1 representing low and high extremes, and 0-others. In various examples, the 2-way features may be defined as described in the 2-way features defined by significance.

The feature vectors with quantized values may then be used to compare the annotated data 114 with the unannotated data 116 to detect uncovered or weakly covered features or feature combinations in the unannotated data.

As one example, a neural network may compute a total of 10 features. The 10 features computed may have values in a range between −2 and 5. The features may then be quantized into discrete values. For example, the features may be quantized from real values into discrete integers by setting values below or equal to 0 as 0, and values above 0 equal to 1. Then, various combinations of features may be analyzed to detect which combinations are present in the annotated training data and the unannotated data. For example, the annotated training data may be analyzed to determine whether any items include a value of 0 for feature #3 and a value of 1 for feature #5. All combinations of features and values may be analyzed in this manner Then, the combinations of values not present in the annotated data may be detected. For example, none of the items in the annotated data may have a combination of zeroes for both feature #1 and feature #9, while the unannotated data may include one or more items with such combination of values. The unannotated data may have features calculated for all items in the unannotated data. The resulting feature values may then be quantized in a similar manner as the feature values corresponding to the annotated data and analyzed to detect items that have zeroes for both features #1 and #9. The items in the unannotated data having zeroes in both features #1 and #9 may be selected to be annotated and added to the training data.

It is to be understood that the block diagram of FIG. 1 is not intended to indicate that the system 100 is to include all of the components shown in FIG. 1. Rather, the system 100 can include fewer or additional components not illustrated in FIG. 1 (e.g., additional client devices, or additional resource servers, etc.).

Figure 2:
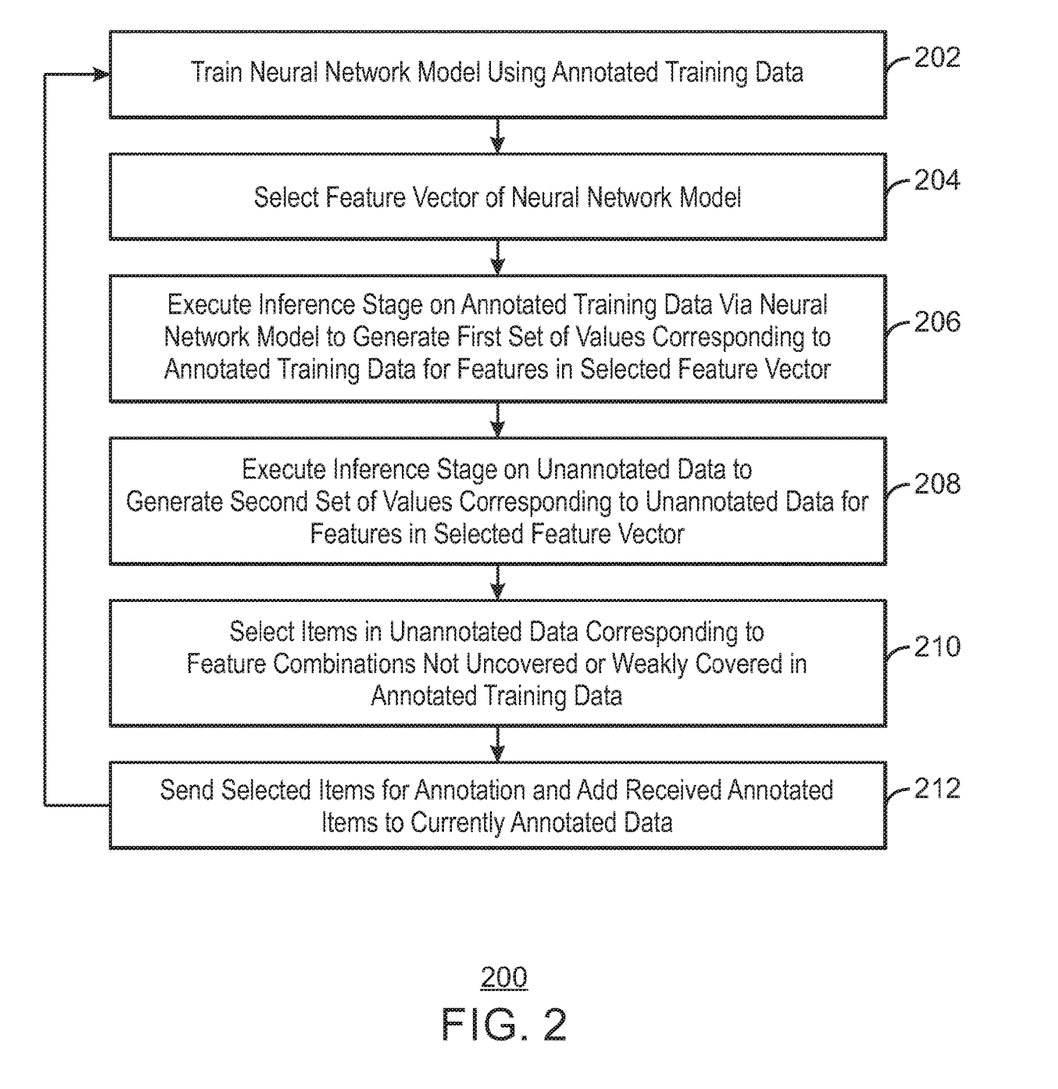
FIG. 2 is a block diagram of an example method that can automatically select unannotated data for annotation.

FIG. 2 is a process flow diagram of an example method that can automatically select unannotated data for annotation. The method 200 can be implemented with any suitable computing device, such as the computing device 300 of FIG. 3 and is described with reference to the system 100 of FIG. 1. For example, the method 200 can be implemented by the computing device 500 or the computer readable medium 600 of FIGS. 5 and 6.

At block 202, a neural network model is trained using annotated training data. For example, the neural network model may be trained to learn machine learning generated features.

At block 204, a feature vector of the neural network model is selected. For example, the feature vector may include features from any combination of layers in the neural network. In some examples, a dimensionality of the selected feature vector the selected feature vector may be reduced via a principal component analysis.

At block 206, an inference stage is executed on the annotated training data via the neural network model to generate a first set of values corresponding to the annotated training data for features in the selected feature vector. In some examples, the first set of values can be quantized. For example, the first set of values may be quantized based on a feature presence, a feature significance, an extremity of features, or any combination thereof. In some examples, the first set of values may be quantized using one-way or two-way ranges. For example, the first set of values can be quantized using based on a two-way feature in response to detecting that the two-way feature occurs in the training set more frequently than an expected frequency of each of single features of the two-way feature. In some examples, the first set of values may be quantized using a first discrete value representing presence of a low extreme, a high extreme, or both, and a second discrete value representing other remaining values. In various examples, the first set of values may be quantized using a first discrete value representing a low extreme, a second discrete value representing a high extreme, and a third discrete value representing other remaining values.

At block 208, the inference stage is executed on unannotated data to generate a second set of values corresponding to the unannotated data for the features in the selected feature vector. In some examples, the second set of values can be quantized. For example, the second set of values may be quantized using the same quantization technique as used for the first set of values.

At block 210, an item in unannotated data corresponding to an uncovered or weakly covered combination of feature values in the annotated training data is selected. In some examples, a plurality of unannotated data items may be ranked based on a number of matched uncovered combinations of feature values. For example, the selected item may include a number of matched uncovered combinations that is higher than other items in the unannotated data.

At block 212, the selected item is sent for annotation and a received corresponding additional annotated item is added to the annotated training data. In some examples, the annotation may be performed by a machine learning algorithm, manually, or any combination of automated and manual techniques.

The process flow diagram of FIG. 2 is not intended to indicate that the operations of the method 200 are to be executed in any particular order, or that all of the operations of the method 200 are to be included in every case. Additionally, the method 200 can include any suitable number of additional operations. For example, the blocks 202-212 may be repeated to iteratively expand the annotated training data by selectively annotating items from the unannotated data.

In some examples, the method 200 may also include further include training a neural network to perform a task based on the annotated training data comprising the additional annotated item.

In some scenarios, the techniques described herein may be implemented in a cloud computing environment. As discussed in more detail below in reference to at least FIGS. 3-6, a computing device configured to automatically select unannotated data for annotation may be implemented in a cloud computing environment. It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 3:
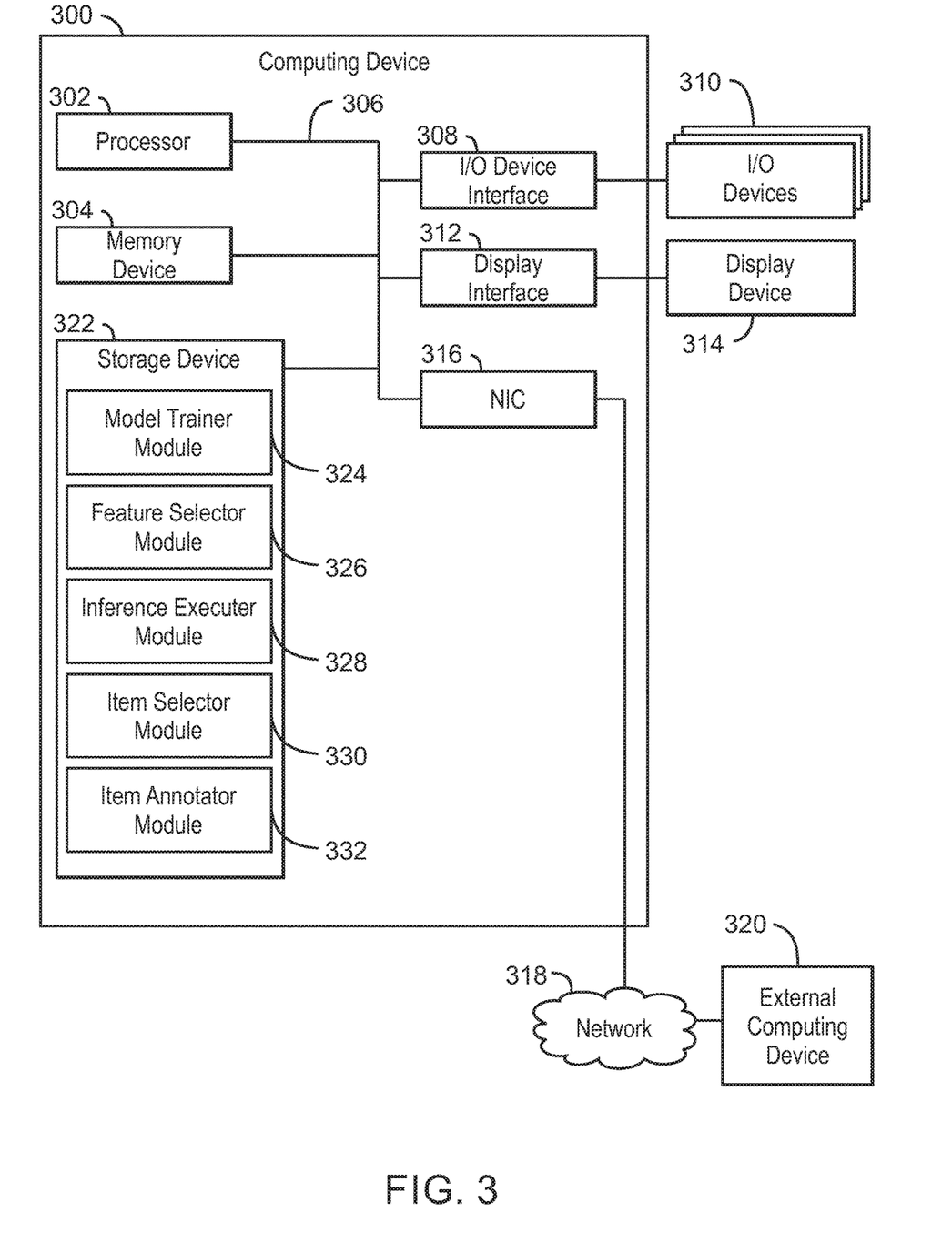
FIG. 3 is a block diagram of an example computing device that can automatically select unannotated data for annotation.

FIG. 3 is block diagram of an example computing device that can automatically select unannotated data for annotation. The computing device 300 may be for example, a server, desktop computer, laptop computer, tablet computer, or smartphone. In some examples, computing device 300 may be a cloud computing node. Computing device 300 may be described in the general context of computer system executable instructions, such as program modules, being executed by a computer system. Generally, program modules may include routines, programs, objects, components, logic, data structures, and so on that perform particular tasks or implement particular abstract data types. Computing device 300 may be practiced in distributed cloud computing environments where tasks are performed by remote processing devices that are linked through a communications network. In a distributed cloud computing environment, program modules may be located in both local and remote computer system storage media including memory storage devices.

The computing device 300 may include a processor 302 that is to execute stored instructions, a memory device 304 to provide temporary memory space for operations of said instructions during operation. The processor can be a single-core processor, multi-core processor, computing cluster, or any number of other configurations. The memory 304 can include random access memory (RAM), read only memory, flash memory, or any other suitable memory systems.

The processor 302 may be connected through a system interconnect 306 (e.g., PCI®, PCI-Express®, etc.) to an input/output (I/O) device interface 308 adapted to connect the computing device 300 to one or more I/O devices 310. The I/O devices 310 may include, for example, a keyboard and a pointing device, wherein the pointing device may include a touchpad or a touchscreen, among others. The I/O devices 310 may be built-in components of the computing device 300, or may be devices that are externally connected to the computing device 300. In various examples, the I/O devices 310 may include various other input devices, such as cameras, microphones, etc.

The processor 302 may also be linked through the system interconnect 306 to a display interface 312 adapted to connect the computing device 300 to a display device 314. The display device 314 may include a display screen that is a built-in component of the computing device 300. The display device 314 may also include a computer monitor, television, or projector, among others, that is externally connected to the computing device 300. In addition, a network interface controller (NIC) 316 may be adapted to connect the computing device 300 through the system interconnect 306 to the network 318. In some embodiments, the NIC 316 can transmit data using any suitable interface or protocol, such as the internet small computer system interface, among others. The network 318 may be a cellular network, a radio network, a wide area network (WAN), a local area network (LAN), or the Internet, among others. An external computing device 320 may connect to the computing device 300 through the network 318. In some examples, external computing device 320 may be an external webserver 320. In some examples, external computing device 320 may be a cloud computing node.

The processor 302 may also be linked through the system interconnect 306 to a storage device 322 that can include a hard drive, an optical drive, a USB flash drive, an array of drives, or any combinations thereof. In some examples, the storage device may include a model trainer module 324, a feature selector module 326, an inference executer module 328, an item selector module 330, and an item annotator module 332. The model trainer module 324 can train a neural network model using annotated training data. For example, model trainer module 324 can train a neural network model to learn a set of features. The feature selector module 326 can select a feature vector of the neural network model. For example, the feature vector may be one or more layers of the neural network. For example, the selected feature vector may be a first fully connected level of the neural network model, a layer above the first fully connected level, or a combination of layers of the neural network model. In various examples, the feature selector module 326 can quantize the first set of values and the second set of values. For example, the feature selector module 326 can quantize the first set of values and the second set of values based on a feature presence. In some examples, the feature selector module 326 can quantize the first set of values and the second set of values based on a feature significance. In various examples, the feature selector module 326 can quantize the first set of values and the second set of values based on a two-way feature that occurs in the annotated training data more frequently than an expected frequency of each of a plurality of single features of the two-way feature. In some examples, the feature selector module 326 can quantize the first set of values and the second set of values based on a feature extremity. For example, the feature selector module 326 can quantize the first set of values and the second set of values based on a feature that occurs in the annotated training data with values exceeding three standard deviations from the mean value for the feature in the annotated training data. The inference executer module 328 can execute an inference stage on the annotated training data via the neural network model to generate a first set of values corresponding to the annotated training data for features in the selected feature vector. The inference executer module 328 can also execute the inference stage on unannotated data to generate a second set of values corresponding to the unannotated data for the features in the selected feature vector. The item selector module 330 can select an item in unannotated data corresponding to an uncovered or weakly covered combination of feature values in the annotated training data. In various examples, the item selector module 330 can quantize values the first set of values and the second set of values. The item annotator module 332 can send the selected item for annotation. For example, item annotator module 332 can send the selected item to an annotator. In some examples, the annotator may be a machine learning apparatus, a manual annotator, or any combination thereof. The annotator module 332 can receive a corresponding additional annotated item to be added to the annotated training data. For example, an annotator may annotate the selected unannotated item and send the annotated item to the annotator module 332 to add the annotated item to the annotated training data. In various examples, the updated annotated training data may then be used to train the neural network to perform various machine learning tasks.

It is to be understood that the block diagram of FIG. 3 is not intended to indicate that the computing device 300 is to include all of the components shown in FIG. 3. Rather, the computing device 300 can include fewer or additional components not illustrated in FIG. 3 (e.g., additional memory components, embedded controllers, modules, additional network interfaces, etc.). Furthermore, any of the functionalities of the trainer module 324, the feature selector module 326, the inference executer module 328, the item selector module 330, and the item annotator module 332, may be partially, or entirely, implemented in hardware and/or in the processor 302. For example, the functionality may be implemented with an application specific integrated circuit, logic implemented in an embedded controller, or in logic implemented in the processor 302, among others. In some embodiments, the functionalities of the trainer module 324, the feature selector module 326, the inference executer module 328, the item selector module 330, and the item annotator module 332 can be implemented with logic, wherein the logic, as referred to herein, can include any suitable hardware (e.g., a processor, among others), software (e.g., an application, among others), firmware, or any suitable combination of hardware, software, and firmware.

Figure 4:
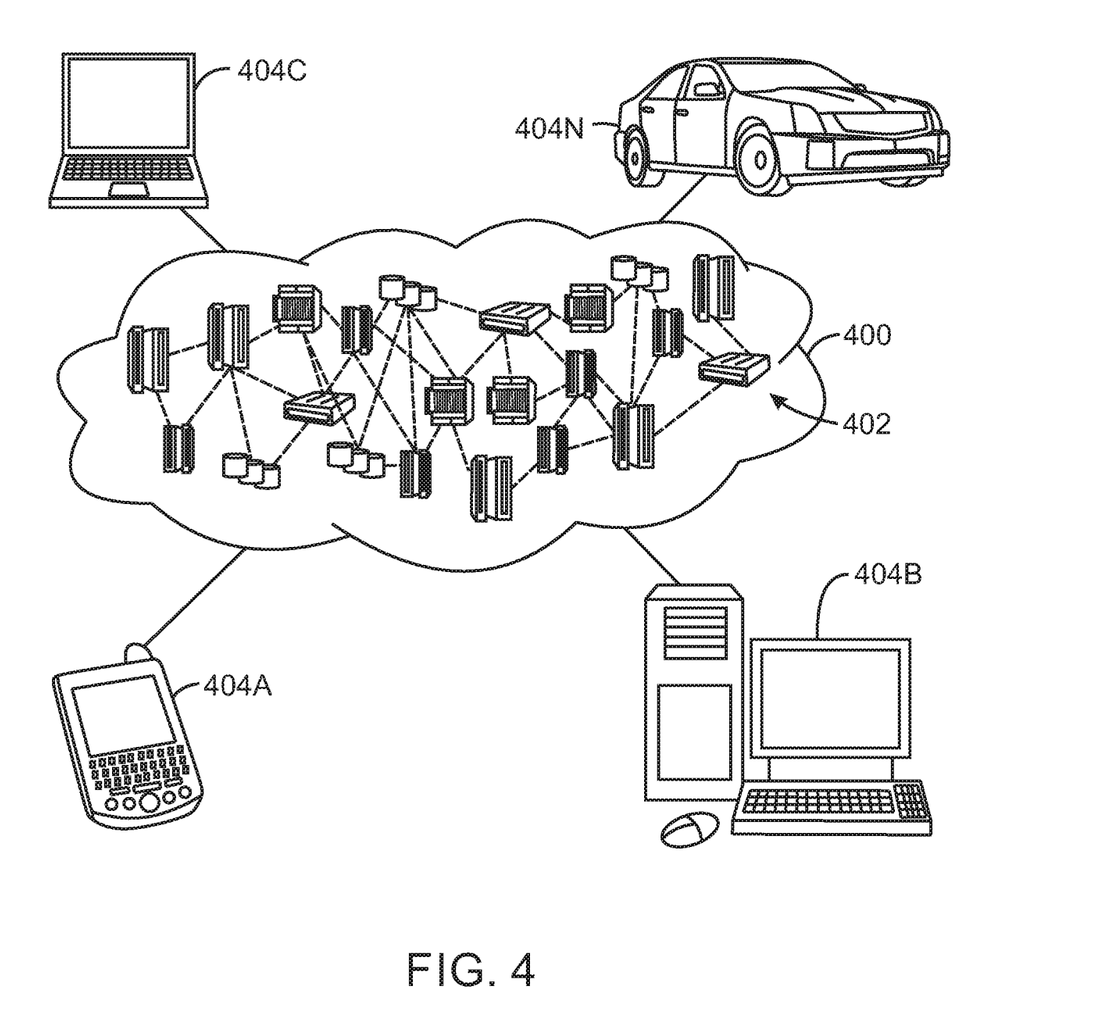
FIG. 4 is a process flow diagram of an example cloud computing environment according to embodiments described herein.

Referring now to FIG. 4, illustrative cloud computing environment 400 is depicted. As shown, cloud computing environment 400 comprises one or more cloud computing nodes 402 with which local computing devices used by cloud consumers, such as, for example, personal digital assistant (PDA) or cellular telephone 404A, desktop computer 404B, laptop computer 404C, and/or automobile computer system 404N may communicate. Nodes 402 may communicate with one another. They may be grouped (not shown) physically or virtually, in one or more networks, such as Private, Community, Public, or Hybrid clouds as described hereinabove, or a combination thereof. This allows cloud computing environment 400 to offer infrastructure, platforms and/or software as services for which a cloud consumer does not need to maintain resources on a local computing device. It is understood that the types of computing devices 404A-N shown in FIG. 4 are intended to be illustrative only and that computing nodes 402 and cloud computing environment 400 can communicate with any type of computerized device over any type of network and/or network addressable connection (e.g., using a web browser).

Figure 5:
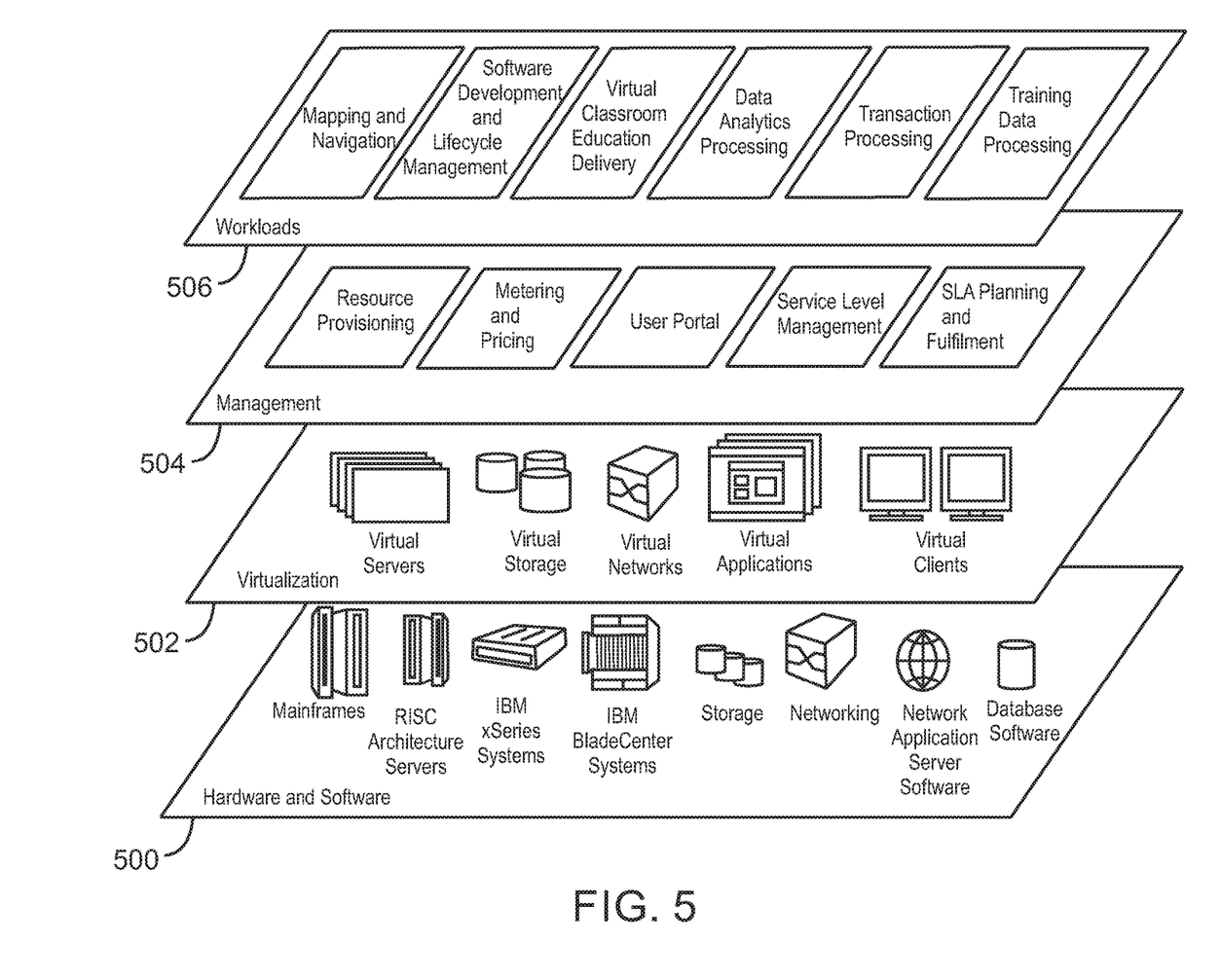
FIG. 5 is a process flow diagram of an example abstraction model layers according to embodiments described herein.

Referring now to FIG. 5, a set of functional abstraction layers provided by cloud computing environment 400 (FIG. 4) is shown. It should be understood in advance that the components, layers, and functions shown in FIG. 5 are intended to be illustrative only and embodiments of the invention are not limited thereto. As depicted, the following layers and corresponding functions are provided.

Hardware and software layer 500 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 502 provides an abstraction layer from which the following examples of virtual entities may be provided: virtual servers; virtual storage; virtual networks, including virtual private networks; virtual applications and operating systems; and virtual clients. In one example, management layer 504 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 506 provides examples of functionality for which the cloud computing environment may be utilized. Examples of workloads and functions which may be provided from this layer include: mapping and navigation; software development and lifecycle management; virtual classroom education delivery; data analytics processing; transaction processing; and training data processing.

The present techniques may be a system, a method or computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present techniques may be assembler instructions, instruction-set-architecture (ISA) instructions, machine instructions, machine dependent instructions, microcode, firmware instructions, state-setting data, or either code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present techniques.

Aspects of the present techniques are described herein with reference to flowchart illustrations and/or block diagrams of methods, apparatus (systems), and computer programs products according to embodiments of the techniques. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 6:
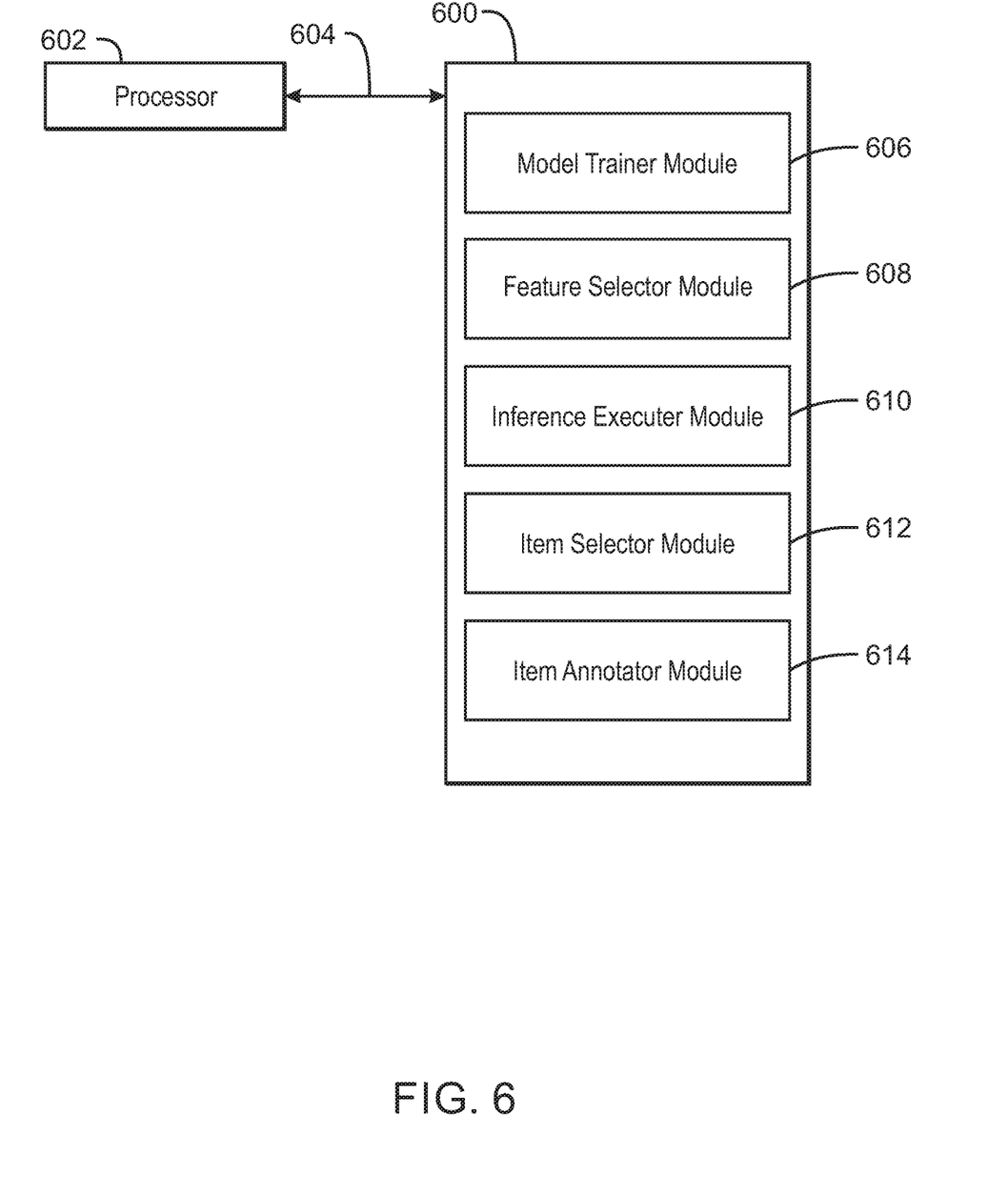
FIG. 6 is an example tangible, non-transitory computer-readable medium that can automatically select unannotated data for annotation.

Referring now to FIG. 6, a block diagram is depicted of an example tangible, non-transitory computer-readable medium 600 that can automatically select unannotated data for annotation. The tangible, non-transitory, computer-readable medium 600 may be accessed by a processor 602 over a computer interconnect 604. Furthermore, the tangible, non-transitory, computer-readable medium 600 may include code to direct the processor 602 to perform the operations of the method 200 of FIG. 2.

The various software components discussed herein may be stored on the tangible, non-transitory, computer-readable medium 600, as indicated in FIG. 6. For example, a model trainer module 606 includes code to train a neural network model using annotated training data. A feature selector module 608 module 608 includes code to select a feature vector of the neural network model. In various examples, the feature selector module 608 further includes code to reduce a dimensionality of the selected feature vector using principal component analysis. An inference executer module 610 includes code to execute an inference stage on the annotated training data via the neural network model to generate a first set of values corresponding to the annotated training data for features in the selected feature vector. The inference executer module 610 also includes code to execute the inference stage on unannotated data to generate a second set of values corresponding to the unannotated data for the features in the selected feature vector. An item selector module 612 includes code to select an item in unannotated data corresponding to an uncovered or weakly covered combination of feature values in the annotated training data. In some examples, the item selector module 612 may include code to quantize the first set of values and the second set of values using an absolute threshold. For example, the item selector module 612 may include code to quantize the first set of values and the second set of values using a relative threshold. In some examples, the item selector module 612 may include code to quantize the first set of values and the second set of values using a median of values in the annotated training data. An item annotator module 614 includes code to send the selected item for annotation and add a received corresponding additional annotated item to the annotated training data. In some examples, the item annotator module 614 may include code to rank unannotated data items based on a number of uncovered features contained in each unannotated data item. For example, the ranking may be based on a minimal number of annotated examples to be used to cover features that are covered in an unannotated sample. As one example, a higher number may correspond to a higher rank. The trainer module 606 also further includes code to train a neural network based on the annotated training data including the additional annotated item. It is to be understood that any number of additional software components not shown in FIG. 6 may be included within the tangible, non-transitory, computer-readable medium 600, depending on the particular application.

The flowchart and block diagrams in the Figures illustrate the architecture, functionality, and operation of possible implementations of systems, methods, and computer program products according to various embodiments of the present techniques. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. It is to be understood that any number of additional software components not shown in FIG. 6 may be included within the tangible, non-transitory, computer-readable medium 600, depending on the specific application.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising a processor to:
   train a neural network model using annotated training data;
   select a feature vector of the neural network model;
   execute an inference stage on the annotated training data via the neural network model to generate a first set of values corresponding to the annotated training data for features in the selected feature vector;

execute the inference stage on unannotated data to generate a second set of values corresponding to the unannotated data for the features in the selected feature vector;

select an item in unannotated data corresponding to an uncovered or weakly covered combination of feature values in the annotated training data; and send the selected item for annotation and receive a corresponding additional annotated item to be added to the annotated training data.

2. The system of claim 1, wherein the selected feature vector comprises a first fully connected level of the neural network model, a layer above the first fully connected level, or a combination of layers of the neural network model.

3. The system of claim 1, wherein the processor is to quantize the first set of values and the second set of values.

4. The system of claim 3, wherein the processor is to quantize the first set of values and the second set of values based on a feature presence.

5. The system of claim 3, wherein the processor is to quantize the first set of values and the second set of values based on a feature significance.

6. The system of claim 5, wherein the processor is to quantize the first set of values and the second set of values based on a two-way feature that occurs in the annotated training data more frequently than an expected frequency of each of a plurality of single features of the two-way feature.

7. The system of claim 1, wherein the processor is to quantize the first set of values and the second set of values based on a feature that occurs in the annotated training data with values exceeding three standard deviations from the mean value for the feature in the annotated training data.

8. A computer-implemented method, comprising:
training, via a processor, a neural network model using annotated training data;
selecting, via the processor, a feature vector of the neural network model;
executing, via the processor, an inference stage on the annotated training data via the neural network model to generate a first set of values corresponding to the annotated training data for features in the selected feature vector;
executing, via the processor, the inference stage on unannotated data to generate a second set of values corresponding to the unannotated data for the features in the selected feature vector;
selecting, via the processor, an item in unannotated data corresponding to an uncovered or weakly covered combination of feature values in the annotated training data; and
sending, via the processor, the selected item for annotation and adding a received corresponding additional annotated item to the annotated training data.

9. The computer-implemented method of claim 8, comprising training a neural network to perform a task based on the annotated training data comprising the additional annotated item.

10. The computer-implemented method of claim 8, comprising reducing, via a principal component analysis, a dimensionality of the selected feature vector.

11. The computer-implemented method of claim 8, comprising ranking a plurality of unannotated data items based on a number of matched uncovered combinations of feature values, wherein the selected item comprises a number of matched uncovered combinations that is higher than other items in the unannotated data.

12. The computer-implemented method of claim 8, comprising quantizing the first set of values and the second set of values using based on a two-way feature in response to detecting that the two-way feature occurs in the training set more frequently than an expected frequency of each of single features of the two-way feature.

13. The computer-implemented method of claim 8, comprising quantizing the first set of values and the second set of values using a first discrete value representing presence of a low extreme, a high extreme, or both, and a second discrete value representing other remaining values.

14. The computer-implemented method of claim 8, comprising quantizing the first set of values and the second set of values using a first discrete value representing a low extreme, a second discrete value representing a high extreme, and a third discrete value representing other remaining values.

15. A computer program product for automatically selecting unannotated data for annotation, the computer program product comprising a computer-readable storage medium having program code embodied therewith, wherein the computer readable storage medium is not a transitory signal per se, the program code executable by a processor to cause the processor to:
train a neural network model using annotated training data;
select a feature vector of the neural network model;
execute an inference stage on the annotated training data via the neural network model to generate a first set of values corresponding to the annotated training data for features in the selected feature vector;
execute the inference stage on unannotated data to generate a second set of values corresponding to the unannotated data for the features in the selected feature vector;
select an item in unannotated data corresponding to an uncovered or weakly covered combination of feature values in the annotated training data;
send the selected item for annotation and add a received corresponding additional annotated item to the annotated training data; and
train a neural network based on the annotated training data comprising the additional annotated item.

16. The computer program product of claim 15, further comprising program code executable by the processor to quantize the first set of values and the second set of values using an absolute threshold.

17. The computer program product of claim 15, further comprising program code executable by the processor to quantize the first set of values and the second set of values using a relative threshold.

18. The computer program product of claim 15, further comprising program code executable by the processor to quantize the first set of values and the second set of values using a median of values in the annotated training data.

19. The computer program product of claim 15, further comprising program code executable by the processor to rank unannotated data items based on a number of uncovered features contained in each unannotated data item.

20. The computer program product of claim 15, further comprising program code executable by the processor to reduce a dimensionality of the selected feature vector using principal component analysis.

* * * * *